United States Patent
Lei et al.

(10) Patent No.: US 11,234,456 B2
(45) Date of Patent: Feb. 1, 2022

(54) MODIFIED CARBON MATERIAL AND METHOD FOR REDUCING CARBONACEOUS MATERIAL IGNITION TEMPERATURE

(71) Applicant: CHINA TOBACCO YUNNAN INDUSTRIAL CO., LTD, Kunming (CN)

(72) Inventors: Ping Lei, Kunming (CN); Jianguo Tang, Kunming (CN); Yongkuan Chen, Kunming (CN); Shanzhai Shang, Kunming (CN); Xudong Zheng, Kunming (CN); Zhiqiang Li, Kunming (CN); Weimin Gong, Kunming (CN); Jingmei Han, Kunming (CN); Chengya Wang, Kunming (CN); Jun Wu, Kunming (CN); Pei He, Kunming (CN); Xiaoli Xu, Kunming (CN); Dongye Cao, Kunming (CN); Zhihua Liu, Kunming (CN)

(73) Assignee: CHINA TOBACCO YUNNAN INDUSTRIAL CO., LTD, Kunming (CN)

( * ) Notice: Subject to any disclaimer, the term of this patent is extended or adjusted under 35 U.S.C. 154(b) by 0 days.

(21) Appl. No.: 17/049,027

(22) PCT Filed: Sep. 25, 2019

(86) PCT No.: PCT/CN2019/107902
§ 371 (c)(1),
(2) Date: Oct. 20, 2020

(87) PCT Pub. No.: WO2020/035081
PCT Pub. Date: Feb. 20, 2020

(65) Prior Publication Data
US 2021/0235742 A1 Aug. 5, 2021

(30) Foreign Application Priority Data
Aug. 13, 2018 (CN) .......................... 201810918505.4

(51) Int. Cl.
A24B 15/16 (2020.01)
A24D 1/22 (2020.01)
(Continued)

(52) U.S. Cl.
CPC .............. *A24B 15/165* (2013.01); *A24D 1/22* (2020.01); *C10L 5/44* (2013.01); *C10L 9/10* (2013.01);
(Continued)

(58) Field of Classification Search
CPC .. C09C 1/48; C09C 1/56; C09C 1/565; A61K 33/44; C10L 5/04; C10L 5/44;
(Continued)

(56) References Cited

U.S. PATENT DOCUMENTS

2006/0090769 A1  5/2006  Woodson et al.
2013/0228465 A1* 9/2013  Zhang-Beglinger ..... C25D 3/12
                                                    205/50

(Continued)

FOREIGN PATENT DOCUMENTS

CN    102580525 A    7/2012
CN    102580675 A    7/2012
(Continued)

OTHER PUBLICATIONS

Adsorption of Copper from Copper Sulphate solution on carbon Black Spheron 9 Jour Chem Cos of Pak vol. 12 No. 3 p. 213-215 (1990) (Year: 1990).*
(Continued)

*Primary Examiner* — Pamela H Weiss
(74) *Attorney, Agent, or Firm* — Bayramoglu Law Offices LLC (57) ABSTRACT

A modified carbon material, including a carbonaceous material and a water-insoluble modifier combined with the carbonaceous material, wherein the water-insoluble modifier is (Continued)

CuO, the carbonaceous material is one of or a mixture of biomass carbon or carbon black, a mass of the water-insoluble modifier is being 0.1-10 wt % of the carbonaceous material. The method for preparing the modified carbon material includes: (1) soaking the carbonaceous material in a copper sulfate solution for 5 to 36 hours, and (2) adding an alkali solution into a solution obtained in step (1) to provide a pH value $\geq 12$, and after keeping the pH value for 0.5 to 2 hours, filtering and drying to obtain a solid. (3) using the carbonaceous material as a combustion heat source to reduce the ignition temperature, increase or reduce the peak thermal power temperature.

5 Claims, 6 Drawing Sheets

(51) Int. Cl.
  *C10L 5/44*  (2006.01)
  *C10L 9/10*  (2006.01)
  *C10L 10/00* (2006.01)

(52) U.S. Cl.
  CPC ....... *C10L 10/00* (2013.01); *C10L 2200/0254* (2013.01); *C10L 2200/0469* (2013.01); *C10L 2230/22* (2013.01); *C10L 2270/08* (2013.01)

(58) Field of Classification Search
  CPC ............. C10L 10/00; C10L 2200/0254; C10L 2200/0469; C10L 9/0002; C10L 9/06; A24D 1/22; A24B 15/16; A24B 15/165; C10B 53/02
  See application file for complete search history.

(56) References Cited

U.S. PATENT DOCUMENTS

| 2015/0183966 | A1* | 7/2015 | Weimar | B32B 37/1284 |
| | | | | 428/704 |
| 2017/0318859 | A1* | 11/2017 | Batista | B65D 85/109 |

FOREIGN PATENT DOCUMENTS

| CN | 105167181 A | 12/2015 |
| CN | 105533800 A | 5/2016 |
| CN | 105747264 A | 7/2016 |
| CN | 107033938 A | 8/2017 |
| CN | 107233898 A | 10/2017 |
| CN | 109222210 A | 1/2019 |
| JP | S6485137 A | 3/1989 |

OTHER PUBLICATIONS

The effect of NOx and CO on the rate of transition metal oxide catalyzed carbon black oxidation An exploratory study Guido Mul, Weidong Zhu Freek Kaptejn Jacob A Moulijn Applied Catalysts B: Environmental 17 (1998) 205-220 (Year: 1998).*
Activated carbon supported CuO nanoparticles: a hybrid material for carbon dioxide adsorption by Cansu Boruban and Emren Nalbant Esenturk J Nanoprt Res (2018) 20:59 published online Feb. 28, 2018 (Year: 2018).*
A Novel Electrochemical Sensor Based on Printex L6 Carbon Black Carrying CuO/Cu2O Nanoparticles for Propylparaben Determination Lorena A Goulart Thais T Guaraldo Marcos R V Lanza Electroanalysis 2018 310 2967-6976 (Year: 2018).*
"Dopamine sensor based on a hybrid material composed of cuprous oxide hollow microspheres and carbon black" Microchim Acta (2015) 182:1361-1369 LiNa Wu Yi Liang Tan Li Wang Sheng Nan Sun Zhi Yu Qu Jun Ming Zhang You Jun Fan (Year: 2015).*

* cited by examiner

MODIFIED CARBON MATERIAL AND METHOD FOR REDUCING CARBONACEOUS MATERIAL IGNITION TEMPERATURE

CROSS REFERENCE TO THE RELATED APPLICATIONS

This application is the national stage entry of International Application No. PCT/CN2019/107902, filed on Sep. 25, 2019, which is based upon and claims priority to Chinese Patent Application No. 201810918505.4, filed on Aug. 13, 2018, the entire contents of which are incorporated herein by reference. The invention is in the technical field of tobacco products, and particularly it relates to a modified carbon material of a heat source for carbon-heated non-combustible cigarettes, and preparation methods and uses thereof.

BACKGROUND

With the increasing demand of people on health, novel tobacco products meeting the demand appear in the tobacco industry. The novel tobacco products can be substantially classified into four main categories: the first category is concerned to electronic cigarettes, the second category is concerned to heated non-combustible tobacco products, the third category is concerned to buccal cigarettes, and the fourth category is concerned to other types of tobacco products. Among them, the heated non-combustible tobacco products get market favors for sufficiently retaining the texture of traditional tobaccos. The main characteristic of the heated non-combustible tobacco products is to utilize external heats source to heat the tobacco but not ignite the tobacco, and this is the most essential difference of the tobacco products as compared to conventional tobaccos. A carbonaceous heat source is a main heat source and its properties will directly influence the quality of the tobacco. According to the characteristics of carbon heated cigarettes, some factors, e.g., whether or not they are inflammable, whether or not they release heat uniformly, and whether or not the combustion rate is controllable, will be directly related to exertion of the quality of the carbon heated cigarettes and user experiences. Properties of carbon materials as raw materials of a carbonaceous heat source will directly influence the properties of the carbonaceous heat source. At present, raw materials for preparing the carbonaceous heat source are biomass materials, such as coconut shells, bamboos, fruit trees, paper, cellulose and the like. However, the carbonaceous heat sources prepared from the biomass materials have many drawbacks. Thus, accurate control and regulations to the combustion performances of the carbonaceous heat sources are difficult to be achieved. For example, the Chinese patent CN107033938 discloses a method for preparation of a carbon material as a heat supply of a carbon-heated cigarette with controllable combustion performances, in which pure cellulose is used as the carbon source to control different pyrolysis temperatures, thereby to obtain a series of carbon materials having different combustion characteristics, and then, the obtained carbon materials are mixed to finally achieve control and regulations to the combustion performances. However, the carbonaceous heat source obtained in the patent still have to be improved in the aspects of easy ignition, homogenous heat release, controllable combustion rate and the like.

Therefore, it is very necessary to provide a carbonaceous heat source with the advantages of easy ignition, controllable combustion rate and homogenous heat release, and meanwhile, the carbonaceous heat source is low in cost and suitable for industrial production.

SUMMARY

Directed to the above drawbacks in the prior art, the technical problem to be solved by the invention is to provide a modified carbon material of a heat source for a carbon-heated non-combustible cigarette and a method of preparing it. The modified carbon material is low in cost, and the method for preparing the material is simple and suitable for industrial productions. Meanwhile, the combustion characteristics of the modified carbon material can be easily controlled and regulated.

A first aspect of the invention discloses a modified carbon material comprising a carbonaceous material and a water-insoluble modifier combined with the carbonaceous material; the modifier is CuO.

Preferably, the carbonaceous material is one of biomass carbon or carbon black or a mixture thereof. The biomass carbon just is a carbon material derived from biomass materials such as coconut shell, bamboo, fruit wood, oak, paper, cellulose, and the like.

Preferably, the modifier is CuO, and it is from 0.1 to 10% by weight of the carbonaceous material A second aspect of the invention discloses a method for reducing the ignition temperature of a carbonaceous material, increasing the peak thermal power and/or reducing the peak thermal power temperature, comprising the following steps:

(1) soaking the carbonaceous material in a copper sulfate solution for from 5 to 36 h, wherein a ratio of carbonaceous material to copper sulfate is controlled so that finally, in the modified carbon material, the CuO is from 0.1 to 10% by weight of the carbonaceous material.

(2) adding an alkali solution into the solution obtained in the step (1) to provide a pH value ≥12, and after keeping the pH value for 0.5 to 2 h, filtering and drying to obtain a solid, the solid just being the modified carbon material as claimed in claim 1;

(3) using the carbonaceous material as a combustion heat source.

Preferably, the copper sulfate solution in the step (1) has a concentration of from 0.5 to 3 wt %.

Preferably, the alkali solution in the step (2) is a sodium hydroxide solution or a potassium hydroxide solution, with a concentration of from 1 to 50 wt %.

Preferably, the drying temperature in the step (2) is in the range of 80-95° C.

Preferably, the ignition temperature is reduced by at least 150° C., the peak thermal powder is at least 50%, and the peak thermal powder temperature is reduced at least 95° C.

The invention has the following favorable effects:

1. According to the invention, CuO is used as a modifier to modify a carbonaceous material for the first time, and the obtained modified carbon material may be as a heat source for carbon-heated non-combustible cigarettes with the advantages of wide-coverage combustion characteristics and controllable combustion characteristics; that is, modified carbon materials obtained by using CuO as a modifier have the characteristics of easy ignition, homogenous heat release, controllable combustion rate and the like. The ignition temperature is reduced by at least 150° C., the peak thermal powder is at least 50%, and the peak thermal powder temperature is reduced at least 95° C.

2. The preparation method according to the invention is simple. According to actual needs, by selecting commonlyused carbon powder, i.e., biomass carbon and carbon black obtained in large-scale industrial productions, the method is lower in cost and suitable for controllable productions in large-scale processes.

DETAILED DESCRIPTION OF THE EMBODIMENTS

The following specific embodiments are used to further describe the invention in detail. However, it should not be understood that the scope of the invention are only limited to the following examples. In the case of no departing from the concept of the method according to the invention, various substitutions and alterations that are made according to the common knowledge and conventional means in the art should be included within the scope of the invention.

Figure 1:
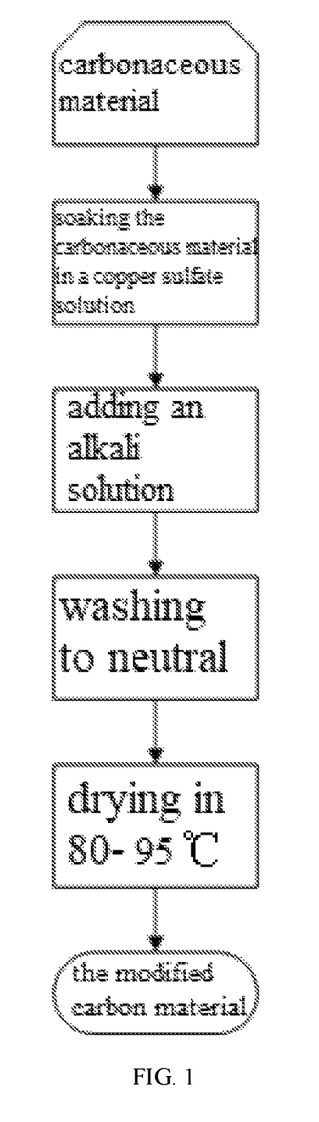
FIG. 1 is a process flow diagram of the method for preparation of the modified carbon material of the invention.

The process flow diagram of the method for producing the modified carbon material according to the invention is shown in FIG. 1.

Example 1

(1) 10000-mesh oak carbon powder (prepared by carbonizing oak at high temperature and pulverizing it) was soaked in a $CuSO_4$ solution with a concentration 6.25 g/L (the mass ratio of $CuSO_4 \cdot 5H_2O$ solid to oak carbon powder solid is 6.25:100) for 24 h.

(2) The soaking solution in step (1) was stirred and during the stirring, a sodium hydroxide solution with a concentration of 10 wt % was slowly added thereto. Until the pH reaches 13, the addition of the sodium hydroxide solution was stopped and the solution was continuously stirred for 1 hour. The solution was washed with suction filtration to neutral and dried at 90° C., and after grinding, the modified carbon powder (2 wt % CuO) was obtained.

Example 2

(1) 10000-mesh oak carbon powder (prepared by carbonizing oak at high temperature and pulverizing it) was soaked in a $CuSO_4$ solution with a concentration 12.5 g/L (the mass ratio of $CuSO_4 \cdot 5H_2O$ solid to oak carbon powder solid is 12.5:100) for 24 h.

(2) The soaking solution in step (1) was stirred and during the stirring, a sodium hydroxide solution with a concentration of 20 wt % was slowly added thereto. Until the pH reaches 13, the addition of the sodium hydroxide solution was stopped and the solution was continuously stirred for 1 hour. The solution was washed with suction filtration to neutral and dried at 90° C., and after grinding, the modified carbon powder (4 wt % CuO) was obtained.

Example 3

(1) 10000-mesh oak carbon powder (prepared by carbonizing oak at high temperature and pulverizing it) was soaked in a $CuSO_4$ solution with a concentration 18.75 g/L (the mass ratio of $CuSO_4 \cdot 5H_2O$ solid to oak carbon powder solid is 18.75:100) for 24 h.

(2) The soaking solution in step (1) was stirred and during the stirring, a sodium hydroxide solution with a concentration of 20 wt % was slowly added thereto. Until the pH reaches 13, the addition of the sodium hydroxide solution was stopped and the solution was continuously stirred for 1 hour. The solution was washed with suction filtration to neutral and dried at 90° C., and after grinding, the modified carbon powder (6 wt % CuO) was obtained.

Example 4

(1) 10000-mesh oak carbon powder (prepared by carbonizing oak at high temperature and pulverizing it) was soaked in a $CuSO_4$ solution with a concentration 25 g/L (the mass ratio of $CuSO_4 \cdot 5H_2O$ solid to oak carbon powder solid is 1:4) for 24 h.

(2) The soaking solution in step (1) was stirred and during the stirring, a sodium hydroxide solution with a concentration of 20 wt % was slowly added thereto. Until the pH reaches 13, the addition of the sodium hydroxide solution was stopped and the solution was continuously stirred for 1 hour. The solution was washed with suction filtration to neutral and dried at 90° C., and after grinding, the modified carbon powder (8 wt % CuO) was obtained.

Example 5

(1) 10000-mesh oak carbon powder (prepared by carbonizing oak at high temperature and pulverizing it) was soaked in a $CuSO_4$ solution with a concentration 3.13 g/L (the mass ratio of $CuSO_4 \cdot 5H_2O$ solid to oak carbon powder solid is 3.13:100) for 24 h.

(2) The soaking solution in step (1) was stirred and during the stirring, a sodium hydroxide solution with a concentration of 1 wt % was slowly added thereto. Until the pH reaches 13, the addition of the sodium hydroxide solution was stopped and the solution was continuously stirred for 1 hour. The solution was washed with suction filtration to neutral and dried at 90° C., and after grinding, the modified carbon powder (1 wt % CuO) was obtained.

Example 6

(1) 10000-mesh oak carbon powder (prepared by carbonizing oak at high temperature and pulverizing it) was soaked in a $CuSO_4$ solution with a concentration 1.56 g/L (the mass ratio of $CuSO_4 \cdot 5H_2O$ solid to oak carbon powder solid is 1.56:100) for 24 h.

(2) The soaking solution in step (1) was stirred and during the stirring, a sodium hydroxide solution with a concentration of 1 wt % was slowly added thereto. Until the pH reaches 13, the addition of the sodium hydroxide solution was stopped and the solution was continuously stirred for 1 hour. The solution was washed with suction filtration to neutral and dried at 90° C., and after grinding, the modified carbon powder (1 wt % CuO) was obtained.

Example 7

(1) 10000-mesh oak carbon powder (prepared by carbonizing oak at high temperature and pulverizing it) was soaked in a $CuSO_4$ solution with a concentration 1.56 g/L (the mass ratio of $CuSO_4.5H_2O$ solid to oak carbon powder solid is 1.56:100) for 24 h.

(2) The soaking solution in step (1) was stirred and during the stirring, a sodium hydroxide solution with a concentration of 1 wt % was slowly added thereto. Until the pH reaches 13, the addition of the sodium hydroxide solution was stopped and the solution was continuously stirred for 1 hour. The solution was washed with suction filtration to neutral and dried at 90° C., and after grinding, the modified carbon powder (0.5 wt % CuO) was obtained.

Example 8

(1) C311 carbon black (C311 is the trademark of the carbon black) was soaked in a $CuSO_4$ solution with a concentration 6.25 g/L (the mass ratio of $CuSO_4.5H_2O$ solid to C311 carbon black solid is 6.25:100) for 24 h.

(2) The soaking solution in step (1) was stirred and during the stirring, a sodium hydroxide solution with a concentration of 10 wt % was slowly added thereto. Until the pH reaches 13, the addition of the sodium hydroxide solution was stopped and the solution was continuously stirred for 1 hour. The solution was washed with centrifugation to neutral and dried at 90° C., and after grinding, the modified carbon powder (2 wt % CuO) was obtained.

Example 9

(1) C311 carbon black (C311 is the trademark of the carbon black) was soaked in a $CuSO_4$ solution with a concentration 12.5 g/L (the mass ratio of $CuSO_4.5H_2O$ solid to C311 carbon black solid is 12.5:100) for 24 h.

(2) The soaking solution in step (1) was stirred and during the stirring, a sodium hydroxide solution with a concentration of 20 wt % was slowly added thereto. Until the pH reaches 13, the addition of the sodium hydroxide solution was stopped and the solution was continuously stirred for 1 hour. The solution was washed with centrifugation to neutral and dried at 90° C., and after grinding, the modified carbon powder (4 wt % CuO) was obtained.

Example 10

(1) C311 carbon black (C311 is the trademark of the carbon black) was soaked in a $CuSO_4$ solution with a concentration 18.75 g/L (the mass ratio of $CuSO_4.5H_2O$ solid to C311 carbon black solid is 18.75:100) for 24 h.

(2) The soaking solution in step (1) was stirred and during the stirring, a sodium hydroxide solution with a concentration of 20 wt % was slowly added thereto. Until the pH reaches 13, the addition of the sodium hydroxide solution was stopped and the solution was continuously stirred for 1 hour. The solution was washed with centrifugation to neutral and dried at 90° C., and after grinding, the modified carbon powder (6 wt % CuO) was obtained.

Example 11

(1) C311 carbon black (C311 is the trademark of the carbon black) was soaked in a $CuSO_4$ solution with a concentration 25 g/L (the mass ratio of $CuSO_4.5H_2O$ solid to C311 carbon black solid is 1:4) for 24 h.

(2) The soaking solution in step (1) was stirred and during the stirring, a sodium hydroxide solution with a concentration of 20 wt % was slowly added thereto. Until the pH reaches 13, the addition of the sodium hydroxide solution was stopped and the solution was continuously stirred for 1 hour. The solution was washed with centrifugation to neutral and dried at 90° C., and after grinding, the modified carbon powder (8 wt % CuO) was obtained.

Example 12

(1) C311 carbon black (C311 is the trademark of the carbon black) was soaked in a $CuSO_4$ solution with a concentration 3.13 g/L (the mass ratio of $CuSO_4.5H_2O$ solid to C311 carbon black solid is 3.13:100) for 24 h.

(2) The soaking solution in step (1) was stirred and during the stirring, a sodium hydroxide solution with a concentration of 1 wt % was slowly added thereto. Until the pH reaches 13, the addition of the sodium hydroxide solution was stopped and the solution was continuously stirred for 1 hour. The solution was washed with centrifugation to neutral and dried at 90° C., and after grinding, the modified carbon powder (1 wt % CuO) was obtained.

Example 13

(1) C311 carbon black (C311 is the trademark of the carbon black) was soaked in a $CuSO_4$ solution with a concentration 1.56 g/L (the mass ratio of $CuSO_4.5H_2O$ solid to C311 carbon black solid is 1.56:100) for 24 h.

(2) The soaking solution in step (1) was stirred and during the stirring, a sodium hydroxide solution with a concentration of 1 wt % was slowly added thereto. Until the pH reaches 13, the addition of the sodium hydroxide solution was stopped and the solution was continuously stirred for 1 hour. The solution was washed with centrifugation to neutral and dried at 90° C., and after grinding, the modified carbon black (1 wt % CuO) was obtained.

Example 14

(1) C311 carbon black (C311 is the trademark of the carbon black) was soaked in a $CuSO_4$ solution with a concentration 1.56 g/L (the mass ratio of $CuSO_4.5H_2O$ solid to C311 carbon black solid is 1.56:100) for 24 h.

(2) The soaking solution in step (1) was stirred and during the stirring, a sodium hydroxide solution with a concentration of 1 wt % was slowly added thereto. Until the pH reaches 13, the addition of the sodium hydroxide solution was stopped and the solution was continuously stirred for 1 hour. The solution was washed with centrifugation to neutral and dried at 90° C., and after grinding, the CuO-modified carbon powder, cited as a modified carbon black (0.5 wt % CuO), was obtained.

Tests and Analyses of Thermal Analytic Performances

The tests used NETZSCH STA 449F3 thermal analyzer to conduct the thermal analytic tests directed to the products in Examples 1-14 and non-modified oak carbon powder and C311 carbon black at a temperature rising rate of 10° C./min in a simulated air atmosphere. Based on the thermal analytic data and according to GB/T 22204-2016 standards, the specific data of the combustion characteristics was calculated and shown in Tables 1 and 2. Table 1 shows the combustion characteristics of the modified oak carbon powder combined with different proportions of CuO; Table 2 shows the combustion characteristics of the modified C311 carbon black combined with different proportions of CuO.

Figure 2:
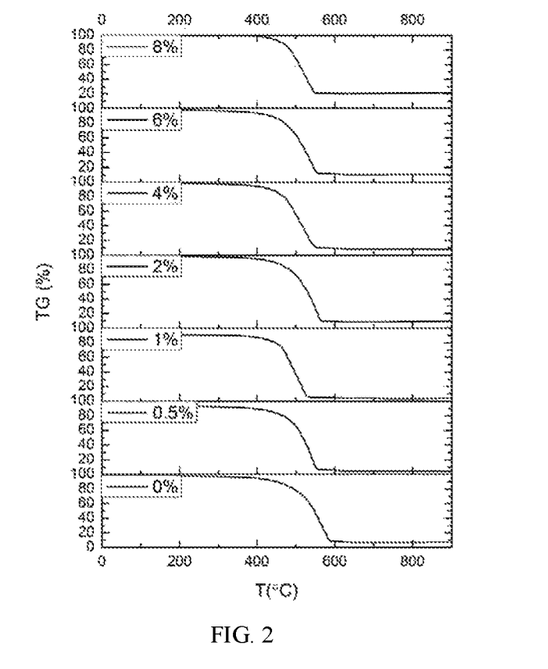
FIG. 2 shows thermogravimetric curves of the modified carbon powders in Examples 1-7 and 10000-mesh oak carbon powder.
Figure 3:
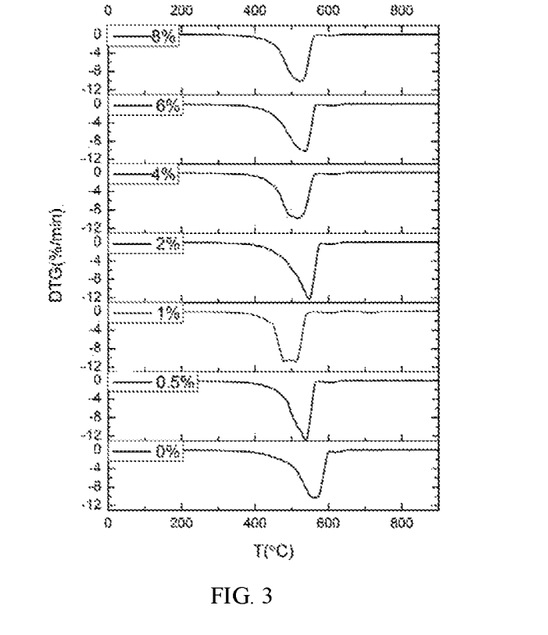
FIG. 3 shows differential thermogravimetric curves of the modified carbon powders in Examples 1-7 and 10,000-mesh oak carbon powder.
Figure 4:
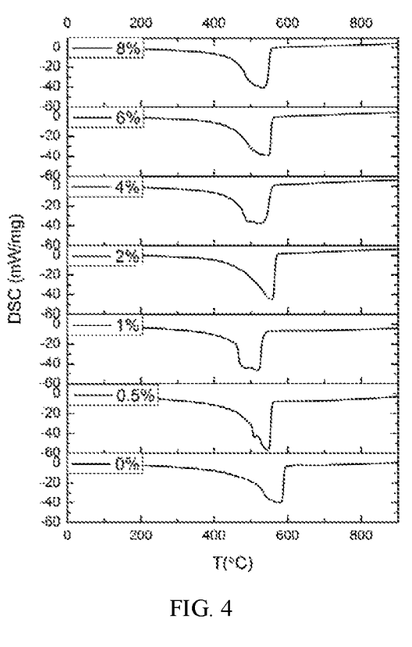
FIG. 4 shows DSC curves of the modified carbon powders in Examples 1-7 and 10,000-mesh oak carbon powder.

As shown in FIGS. 2, 3, 4 and Table 1, for the modified oak carbon powders with different amounts of CuO, the thermogravimetric curves, the differential thermogravimetric curves and the DSC curves exhibit regular movements toward low temperature zones, and the controls to the ignition temperature between 454.7 and 488.8° C. are realized. The other parameters of the combustion characteristics also can be effectively varied, in which the fractal of the DSC curve of the 4 wt % CuO-modified oak carbon powder has a peak in a widest and lowest shape, and the heat release is relatively mild during the temperature programming.

TABLE 1

Combustion Characteristics of modified oak carbon powders combined with different proportions of CuO

|  | 0 wt % CuO | 0.5 wt % CuO | 1 wt % CuO | 2 wt % CuO | 4 wt % CuO | 6 wt % CuO | 8 wt % CuO |
|---|---|---|---|---|---|---|---|
| Ignition temperature ° C. | 488.8 | 487.86 | 454.70 | 493.7 | 461.7 | 474.1 | 467.57 |
| Burning-off temperature ° C. | 583.2 | 554.91 | 528.95 | 564.7 | 545.2 | 554.1 | 548.4 |
| Maximum combustion rate %/min | 10.32 | 12.90 | 10.89 | 12.17 | 9.71 | 10.23 | 10.06 |
| Maximum combustion rate temperature ° C. | 556.0 | 538.52 | 510.77 | 547.67 | 515.74 | 537.1 | 523.9 |
| Peak heat power mW/mg | 40.12 | 56.61 | 46.74 | 45.00 | 37.51 | 38.96 | 40.77 |
| Peak thermal power temperature ° C. | 565.7 | 545.12 | 518.86 | 556.3 | 518.1 | 546.0 | 531.5 |

Figure 5:
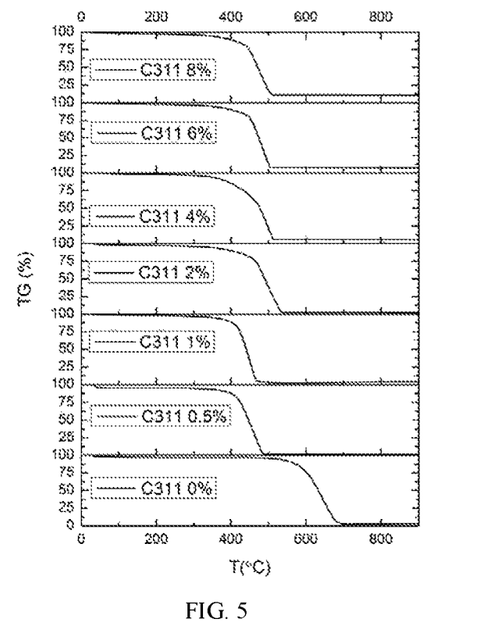
FIG. 5 shows thermogravimetric curves of the modified carbon powders in Examples 8-14 and C311 carbon black.
Figure 6:
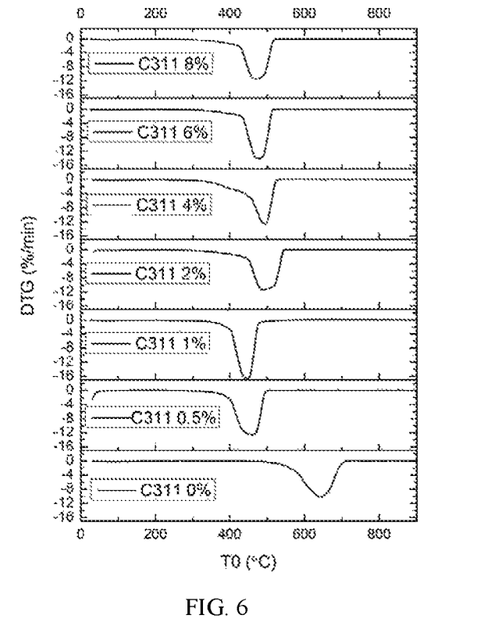
FIG. 6 shows differential thermogravimetric curves of the modified carbon powders in Examples 8-14 and C311 carbon black.
Figure 7:
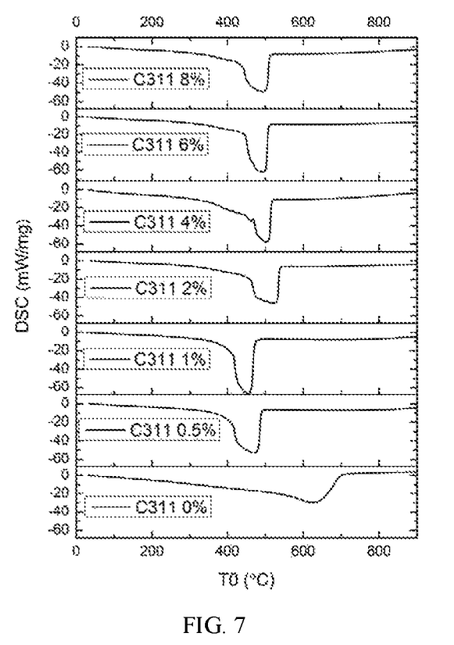
FIG. 7 shows DSC curves of the modified carbon powders in Examples 8-14 and C311 carbon black.

As shown in FIGS. 5, 6, 7 and Table 1, for modified C311 carbon black with different amounts of CuO, the thermogravimetric curves, the differential thermogravimetric curves and the DSC curves remarkably move toward low temperature zone as compared to C311 carbon black, and the controls of the ignition temperature between 412.1 and 600.0° C. are realized. The other parameters of the combustion characteristics also can be effectively varied, and for example, the peak thermal powder is remarkably increased, and the peak thermal powder temperature is remarkably lowered.

TABLE 2

Combustion Characteristics of modified C311 carbon black combined with different proportions of CuO

|  | 0 wt % CuO | 0.5 wt % CuO | 1 wt % CuO | 2 wt % CuO | 4 wt % CuO | 6 wt % CuO | 8 wt % CuO |
|---|---|---|---|---|---|---|---|
| Ignition temperature ° C. | 600.0 | 412.1 | 413.1 | 449.34 | 443.76 | 443.10 | 431.93 |
| Burning-off temperature ° C. | 671 | 485.1 | 467 | 535.39 | 517.11 | 505.59 | 508.88 |
| Maximum combustion rate %/min | 10.11 | 12.59 | 16.69 | 11.27 | 12.55 | 14.16 | 11.56 |
| Maximum combustion rate temperature ° C. | 644.83 | 460.56 | 446.91 | 486.92 | 493.63 | 479.46 | 468.51 |
| Peak heat power mW/mg | 29.56 | 53.17 | 66.76 | 46.30 | 57.55 | 62.14 | 49.14 |
| Peak thermal power temperature ° C. | 617.7 | 470 | 454.1 | 520.50 | 503.82 | 492.84 | 492.09 |

Example 15

Figure 8:
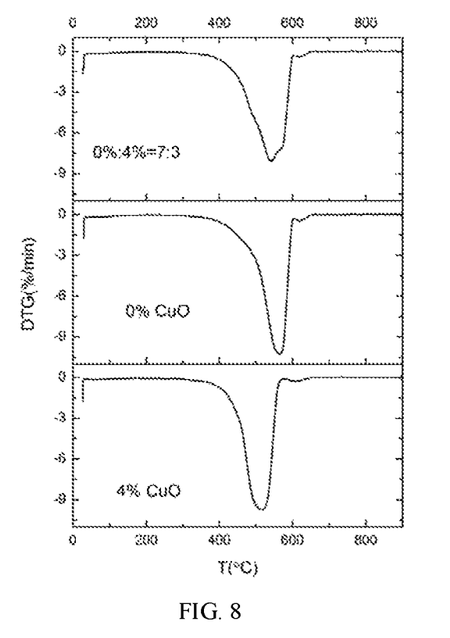
FIG. 8 shows a thermogravimetric curve of the mixed carbon powder in Example 15.
Figure 9:
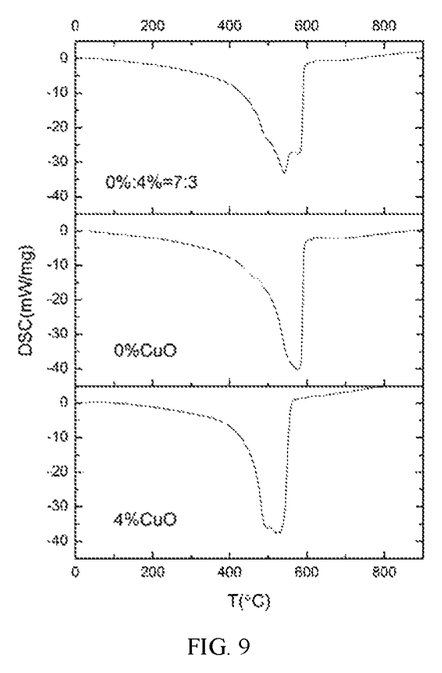
FIG. 9 shows a DSC curve of the mixed carbon powder in Example 15.

The modified carbon black obtained in Example 2 and oak carbon powder were mixed in a mass ratio of 3:7 in a kneader while stirring to obtain a novel modified carbon powder which was further tested with the thermal analytical performances. From the curves shown in FIGS. 8 and 9, it can be seen that the novel modified carbon powder obtained after mixing has a wider and lower peak shape as compared to the modified carbon powder in Example 2 and the initial oak carbon powder, and it has a milder heat release during the temperature programming. The example demonstrates that for the CuO-modified carbon powder, a higher CuO amount will be not necessarily favorable.

What is claimed is:

1. A method for preparing a modified carbon material comprising CuO wherein the method comprises the following steps:
   (1) obtaining a first solution by soaking a carbonaceous material in a copper sulfate solution for 5 to 36 hours, wherein a ratio of the carbonaceous material to the copper sulfate solution is controlled to control the CuO in the modified carbon material to be 1% by weight of the carbonaceous material;
   (2) adding an alkali solution into the first solution obtained in step (1) to provide a pH value ≥12, and after keeping the pH value for 0.5 to 2 hours, filtering and drying to obtain a solid, wherein the solid is the modified carbon material.

2. The method according to claim 1, wherein the copper sulfate solution in step (1) has a concentration of from 0.5 to 3 wt %.

3. The method according to claim 1, wherein the alkali solution in step (2) is a sodium hydroxide solution or a potassium hydroxide solution, with a concentration of from 1 to 50 wt %.

4. The method according to claim 1, wherein a drying temperature in step (2) is in a range from 80 to 95° C.

5. The method according to claim 1, wherein the carbonaceous material is carbon black.

* * * * *